United States Patent
Hong et al.

(10) Patent No.: US 9,753,538 B2
(45) Date of Patent: Sep. 5, 2017

(54) TOUCH DISPLAY DEVICE FOR ENERGY HARVESTING

(71) Applicant: Samsung Display Co., Ltd., Yongin, Gyeonggi-Do (KR)

(72) Inventors: Won-Ki Hong, Suwon-si (KR); Jong Seo Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 36 days.

(21) Appl. No.: 14/811,709

(22) Filed: Jul. 28, 2015

(65) Prior Publication Data

US 2016/0124555 A1  May 5, 2016

(30) Foreign Application Priority Data

Oct. 29, 2014  (KR) .................. 10-2014-0148359

(51) Int. Cl.
  *G06F 3/041* (2006.01)
  *G06F 3/01* (2006.01)

(52) U.S. Cl.
  CPC .............. *G06F 3/016* (2013.01); *G06F 3/041* (2013.01); *G06F 3/0416* (2013.01)

(58) Field of Classification Search
  CPC .................. G06F 3/044; G06F 3/0412; G06F 2203/04103; H02N 1/04
  See application file for complete search history.

(56) References Cited

U.S. PATENT DOCUMENTS

| | | | |
|---|---|---|---|
| 7,843,277 B2 | 11/2010 | Gregorio et al. | |
| 8,179,377 B2 | 5/2012 | Ciesla et al. | |
| 8,686,952 B2 | 4/2014 | Burrough et al. | |
| 2002/0190689 A1* | 12/2002 | Nakamura | G04C 10/00 320/102 |
| 2004/0185178 A1* | 9/2004 | Rood | B05D 5/08 427/355 |
| 2004/0212276 A1* | 10/2004 | Brantner | H02N 2/181 310/319 |
| 2008/0187191 A1* | 8/2008 | Huang | G06K 9/00053 382/124 |
| 2009/0303201 A1* | 12/2009 | Isoda | H05B 6/062 345/173 |
| 2010/0225456 A1* | 9/2010 | Eldering | G06F 3/016 340/407.2 |
| 2011/0100727 A1* | 5/2011 | Choi | G06F 3/0418 178/18.01 |
| 2011/0157075 A1* | 6/2011 | Yang | G06F 3/0412 345/174 |
| 2012/0105333 A1 | 5/2012 | Maschmeyer et al. | |

(Continued)

FOREIGN PATENT DOCUMENTS

KR  10-2011-0041043 A  4/2011
KR  10-2014-0012410 A  2/2014

(Continued)

*Primary Examiner* — Benjamin C Lee
*Assistant Examiner* — Dong Hui Liang
(74) *Attorney, Agent, or Firm* — Innovation Counsel LLP (57) ABSTRACT

Disclosed herein is a touch display device, including: a panel including a plurality of sensing electrodes which are arranged under a dielectric layer and in a matrix configuration; a rectification unit including at least one rectifier configured to be connected to at least two sensing electrodes; and an energy storage unit including at least one capacitive element which is connected to the rectifier.

11 Claims, 7 Drawing Sheets

(56) References Cited

U.S. PATENT DOCUMENTS

| | | | |
|---|---|---|---|
| 2012/0113038 A1* | 5/2012 | Chen | G06F 3/0412 345/173 |
| 2013/0106765 A1* | 5/2013 | Beecher | G06F 3/044 345/174 |
| 2015/0055057 A1* | 2/2015 | Huang | G02F 1/13338 349/62 |
| 2015/0097465 A1* | 4/2015 | Karagozler | H02N 1/08 310/300 |

FOREIGN PATENT DOCUMENTS

| | | |
|---|---|---|
| KR | 10-2014-0027695 A | 3/2014 |
| KR | 10-2014-0046204 A | 4/2014 |

\* cited by examiner

TOUCH DISPLAY DEVICE FOR ENERGY HARVESTING

CROSS-REFERENCE TO RELATED APPLICATION

This application claims priority to, and the benefit of, Korean Patent Application No. 10-2014-0148359 filed in the Korean Intellectual Property Office on Oct. 29, 2014, the entire contents of which are incorporated herein by reference.

BACKGROUND (a) Technical Field

Embodiments of the present invention relate generally to touch-sensitive displays. More specifically, embodiments of the present invention relate to touch-sensitive display devices for energy harvesting.

(b) Description of the Related Art

A touch-sensitive display device, or simply a touch display device, may refer to a display device in which a touch function is added to a liquid crystal display, a field emission display (FED), a plasma display panel (PDP), an electroluminescence device (EL), an electrophoretic display, and the like.

Touch-sensitivity may be accomplished by separate touch and display panels. To that end, a touch panel and a display panel may be separately formed or integrally formed. Recently, to implement a portable terminal that is thin, development efforts have focused on an in-cell type of touch display device in which a touch panel is included in the display device.

Further, the touch panel is classified into a mutual capacitance type and a self capacitance type of panel, according to a type of a touch electrode configuration.

In the mutual capacitance type panel, since a Tx electrode and an Rx electrode are separately present, a change in mutual capacitance is measured to determine whether a touch is made.

In the self capacitance type panel, the Tx electrode and the Rx electrode are not differentiated from each other and each electrode independently senses the change in self capacitance to determine whether a touch is made.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a touch display device and a driving method thereof having advantages of an energy harvesting function through electricity generated by touches.

An exemplary embodiment of the present invention provides a touch display device, including: a panel including a plurality of sensing electrodes which are arranged under a dielectric layer and in a matrix configuration; a rectification unit including at least one rectifier configured to be connected to at least two sensing electrodes; and an energy storage unit including at least one capacitive element which is connected to the rectification unit.

The plurality of sensing electrodes may comprise N pairs of the sensing electrodes, where N is a natural number; the rectification unit may include N rectifiers, and each pair of the sensing electrodes may be connected to a different one of the rectifiers.

The rectification unit may comprise one rectifier, and the plurality of sensing electrodes may be connected to or disconnected from the one rectifier according to a control signal.

The dielectric layer may be configured to receive a negative charge.

The panel may be bent so as to have a curved shape so as to have a first radius of curvature, and the panel may be further configured to receive a voltage and to flatten in response to the received voltage so as to have a second radius of curvature, the second radius of curvature being larger than the first radius of curvature.

The touch display device may be a self capacitance type display device.

The touch display device may further include: a timing control unit configured to output a control signal during at least one of a plurality of driving modes, the plurality of driving modes including a first driving mode, a second driving mode, and a third driving mode; a touch control unit configured to supply a touch driving voltage and to process a touch signal; and a mode selection unit configured to connect the sensing electrodes to the touch control unit in the first driving mode and to selectively connect ones of the sensing electrodes to the rectification unit in the second driving mode.

The touch display device may further include a haptic driving unit configured to supply a haptic voltage, wherein the mode selection unit is further configured to connect the sensing electrodes to the haptic driving unit in the third driving mode.

The touch display device may be further configured to implement each driving mode in a time divided manner.

The touch display device may be further configured to implement the second driving mode after the first driving mode, at least two sensing electrodes may form a circuit in the second driving mode, together with the rectifier of the rectification unit, and the energy storage unit may be configured to store a current generated in the closed circuit by a touch.

The touch display device may be further configured to repeatedly implement the first driving mode and the second driving mode during a dead time of the display.

According to an exemplary embodiment of the present invention, it is possible to provide a touch display device and associated driving method having an energy harvesting function harvesting electricity from touches.

DETAILED DESCRIPTION OF THE EMBODIMENTS

Hereinafter, exemplary embodiments of the present invention will be described in detail with reference to the accompanying drawings. However, the detailed description of known functions or components which may obscure the gist of the present invention will be omitted in the following description and the accompanying drawings. Further, it is to be noted that the same components throughout the drawings are denoted by the same reference numerals if possible.

Terms and words used in the present specification and claims to be described below are not to be construed as a general or dictionary meaning, but are to be construed with meanings and concepts meeting the technical ideas of the present invention based on a principle that the present inventors may appropriately define the concepts of terms in order to describe their inventions in best mode. Therefore, the configurations described in the exemplary embodiments and drawings of the present specification are merely most preferable embodiments of the present invention, but do not represent all of the technical spirit of the present invention. Thus, the present invention should be construed as including all the changes, equivalents, and substitutions included in the spirit and scope of the present invention at the time of filing this application. Further, terms used in the 'first', 'second', etc., may be used to describe various components, but are used to distinguish one component from another component and therefore are not used to limit the components.

The various Figures are not to scale. All numerical values are approximate, and may vary. All examples of specific materials and compositions are to be taken as nonlimiting and exemplary only. Other suitable materials and compositions may be used instead.

Figure 1:
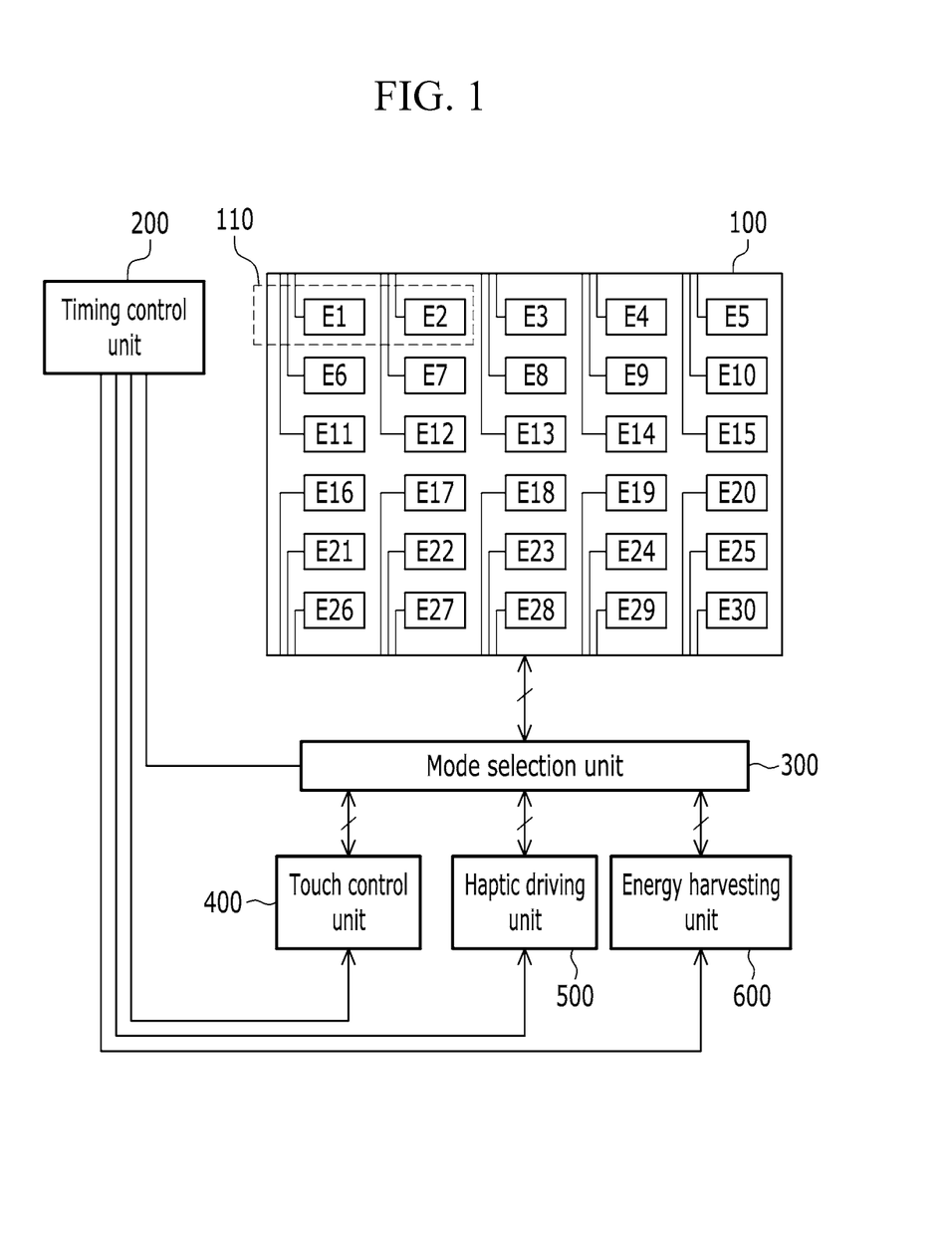
FIG. 1 is a diagram illustrating a configuration of a touch display device according to an exemplary embodiment of the present invention.

FIG. 1 is a diagram illustrating a configuration of a touch display device according to an exemplary embodiment of the present invention.

Referring to FIG. 1, a touch display panel according to an exemplary embodiment of the present invention includes a panel 100 with a plurality of sensing electrodes E1 to E30, a timing control unit 200, a mode selection unit 300, a touch control unit 400, a haptic driving unit 500, and an energy harvesting unit 600.

The configuration illustrated in FIG. 1 is exemplary, and therefore the present invention is not limited thereto. For example, even when the haptic driving unit 500 is removed, the touch display device may continue to operate as before, except for not providing a user a sense of touch.

Further, the touch display device may be configured so that the sensing electrodes E1 to E30 may be directly connected to the touch control unit 400 or the energy harvesting unit 600, and the timing control unit 200 may be configured to drive the panel 100, such that the mode selection unit 300 may also be removed.

Names of each component are determined for convenience of explanation, and each component may be separately formed or may be integrally formed with other components.

In the panel 100, a display panel and a touch panel may be separately configured. For convenience of explanation, embodiments of the present invention are based on the premise that the display panel and the touch panel are integrally formed.

The panel 100 is formed with the plurality of sensing electrodes E1 to E30 which are arranged in a matrix configuration. For convenience of explanation, in the drawings, 30 sensing electrodes are formed, but the number of sensing electrodes is not limited thereto, and any number of sensing electrodes is contemplated.

The sensing electrodes E1 to E30 may be configured of a transparent conductor (for example, ITO, graphene, CNT, and Ag nanowire) for a display mode.

The sensing electrodes E1 to E30 may have, for example, a dot matrix form or a stripe form.

For convenience of explanation, in the present invention, a case in which each sensing electrode is configured as a self-capacitance type electrode will be described. That is, the respective sensing electrodes are connected by separate wirings.

A dielectric layer 111 (see FIG. 2) is formed on the matrix of sensing electrodes E1 to E30.

The plurality of sensing electrodes E1 to E30 may be selectively connected to the touch control unit 400, the haptic driving unit 500, or the energy harvesting unit 600 through the mode selection unit 300.

The touch control unit 400 is configured to control a general touch function. The touch control unit 400 may include a separate power supply for supplying a touch driving voltage. Further, the touch control unit 400 may include a processing circuit which determines whether a touch signal is input and which transmits touch coordinates to an application processor (AP).

The haptic driving unit 500 is configured to apply a voltage signal to provide tactile feedback to the user when he or she touches the panel 100. The haptic driving unit 500 may include a separate power supply which selectively applies a voltage to the plurality of sensing electrodes E1 to E30. At the time of driving the haptic driving unit 500, tactile feedback may be implemented by a variety of amplitudes, frequencies, phase modulations, and the like.

The energy harvesting unit 600 is configured to harvest and store friction electricity (triboelectricity) which is generated at the time of the user touch. The energy harvesting unit 600 includes a rectification unit 610 and an energy storage unit 620. More detailed configuration and operation of the energy harvesting unit 600 are described in an exemplary embodiment of FIG. 6.

The mode selection unit 300 switches a connection relationship between the sensing electrodes E1 to E30 and the touch control unit 400, the haptic driving unit 500, and the energy harvesting unit 600 according to a control signal from the timing control unit 200. The mode selection unit 300 is driven in a time division manner for the dead time of the display and thus may switch the connection relationship. The mode selection unit 300 may be configured as a multiplexer.

The timing control unit 200 uses an image signal, a horizontal synchronization signal Hsync, a vertical synchronization signal Vsync, a clock signal, and the like which are received from an external source, so as to generate image data, a data control signal, a gate control signal, and the like for the display, and supplies the generated image data, data control signal, gate control signal, and the like to a data driving unit (not illustrated) and a gate driving unit (not illustrated).

Embodiments of the present invention describe an operation of the system of FIG. 1 during the dead time of the display, not during image display. Accordingly, the data driving unit and the gate driving unit are not described in detail, for convenience of explanation.

The timing control unit 200 outputs control signals to the mode selection unit 300, the touch control unit 400, the haptic driving unit 500, and the energy harvesting unit 600 depending on a driving mode, to control operation during the dead time of the display.

A first driving mode is a touch sensing mode which is driven by connecting the plurality of sensing electrodes E1 to E30 to the touch control unit 400.

The second driving mode is an energy harvesting mode which is driven by connecting the plurality of sensing electrodes E1 to E30 to the energy harvesting unit 600, and in particular the rectification unit 610.

A third driving mode is a haptic providing mode which is driven by connecting the plurality of sensing electrodes E1 to E30 to the haptic driving unit 500.

The timing control unit 200 may select the driving modes in any order. As one nonlimiting example, the timing control unit 200 may select, in order, the first driving mode, then the second driving mode, then the third driving mode. These selections may then be repeated, perhaps (although not necessarily) in order. Further, the timing control unit 200 may select only the first driving mode and the second driving mode, where the first driving mode and the second driving mode are repeated twice or more during the dead time of the display, to enable the function of the touch display device to emphasize energy harvesting.

Therefore, how to time-divide and drive each driving mode is not limited.

Figure 2:
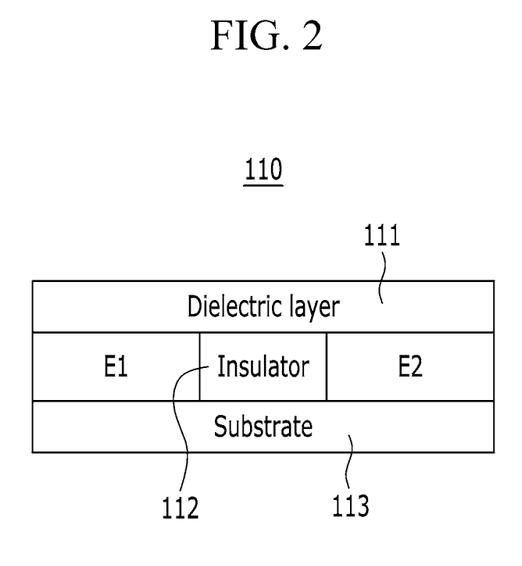
FIG. 2 is an enlarged cross-sectional view of a portion of a touch display device.

FIG. 2 is an enlarged cross-sectional view of a portion 110 of the touch display device. Referring to FIG. 2, the portion 110 of the touch display device includes the dielectric layer 111, an insulator 112, the first sensing electrode E1, the second sensing electrode E2, and a substrate 113.

The substrate 113 may include a display panel and wiring connected to the sensing electrode, which is omitted for convenience of explanation, as such components, their construction, and their configuration are known.

The first sensing electrode E1 and the second sensing electrode E2 are disposed on the substrate 113, being spaced apart from each other while having the insulator 112 therebetween. The reason why only the two sensing electrodes are illustrated is for convenience of explanation, and the first sensing electrode E1 and the second sensing electrode E2 may each also represent a multiple sensing electrodes depending on the connection relationship between the sensing electrodes.

The dielectric layer 111 may be deposited on the first sensing electrode E1, the second sensing electrode E2, and the insulator 112. The dielectric layer 111 may be charged with a negative charge.

Figure 3A:
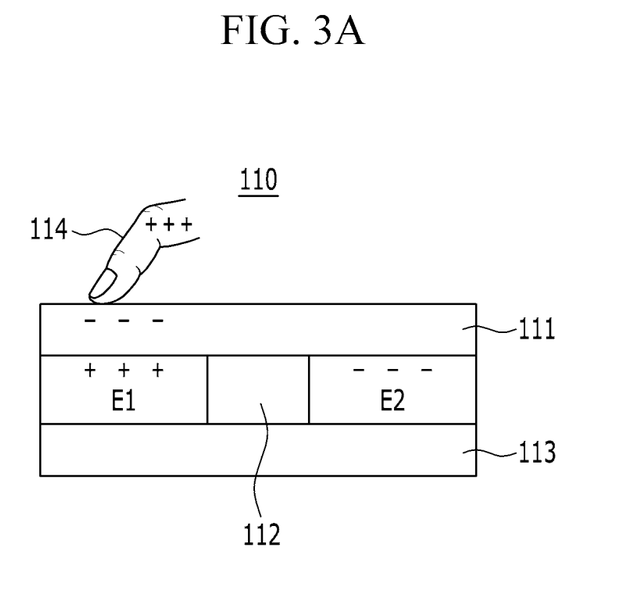
FIGS. 3A and 3B are diagrams illustrating a process of generating electricity by a user touch.
Figure 3B:
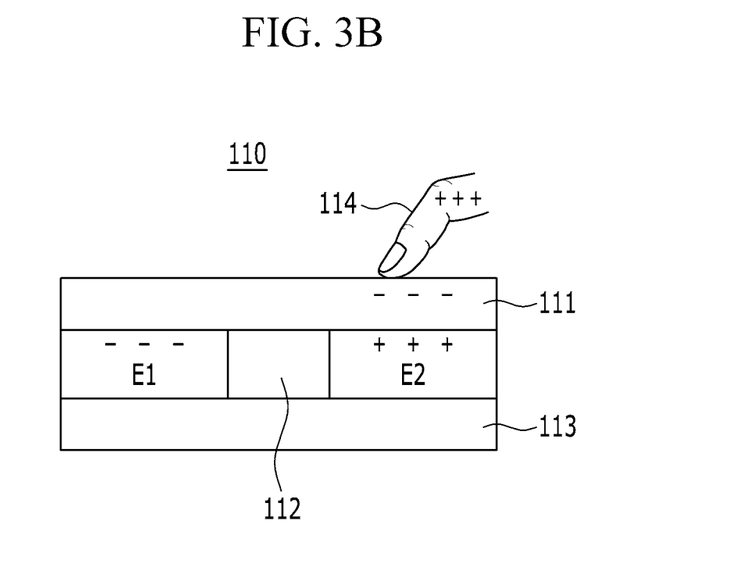

FIGS. 3A and 3B are diagrams illustrating a process of generating friction electricity from user touches. In FIG. 3A, a user's finger 114 is touched on the first sensing electrode E1. In FIG. 3B, as the user's finger 114 moves, the user's finger 114 is touched on the second sensing electrode E2.

For convenience of explanation, the present embodiment describes only the case in which the dielectric layer 111 is negatively charged. However, the present embodiment may also describe a case in which the dielectric layer 111 is positively charged, and even in the case in which the dielectric layer 111 is neutral, the present embodiment may exhibit a similar effect due to the relative friction electricity.

In FIG. 3A, the user's finger 114 is relatively charged with positive charge due to the dielectric layer 111 which is charged with negative charge. Thereby, the first sensing electrode E1 is charged with positive charge. As a result, the nearby second sensing electrode E2 (which may surround the first sensing electrode E1) is charged with negative charge. Therefore, when the first sensing electrode E1 and the second sensing electrode E2 are connected to each other by an electric wire, a current flows from the first sensing electrode E1 to the second sensing electrode E2.

In FIG. 3B, the user's finger 114 is relatively charged with positive charge and the second sensing electrode E2 is charged with positive charge, due to the dielectric layer 111 which is negatively charged. In this case, the nearby first sensing electrode E1 is charged with negative charge.

Therefore, when the first sensing electrode E1 and the second sensing electrode E2 are connected to each other by an electric wire, a current flows from the second sensing electrode E2 to the first sensing electrode E1.

A configuration of the energy harvesting unit 600, which harvests and stores a current, will be described in detail in the exemplary embodiment of FIG. 6.

Figure 4A:
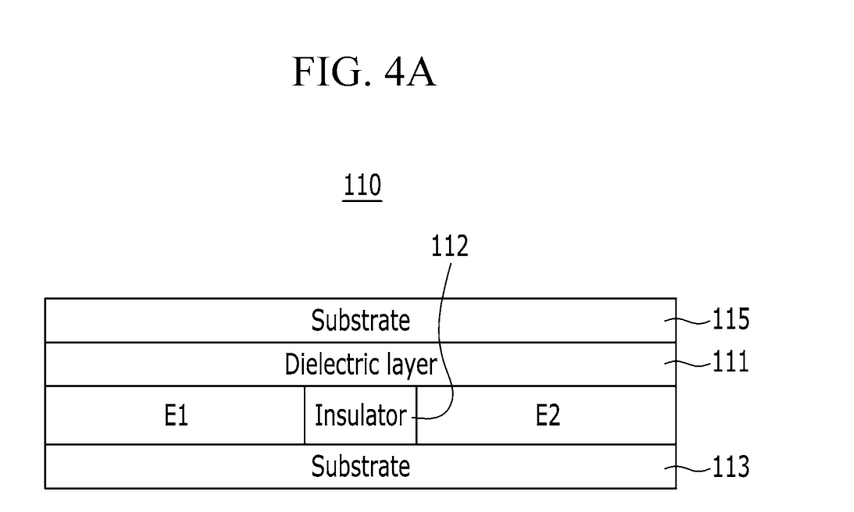
FIGS. 4A, 4B, and 4C are diagrams describing a configuration of a touch display device according to another exemplary embodiment of the present invention and an associated process of generating electricity.
Figure 4B:
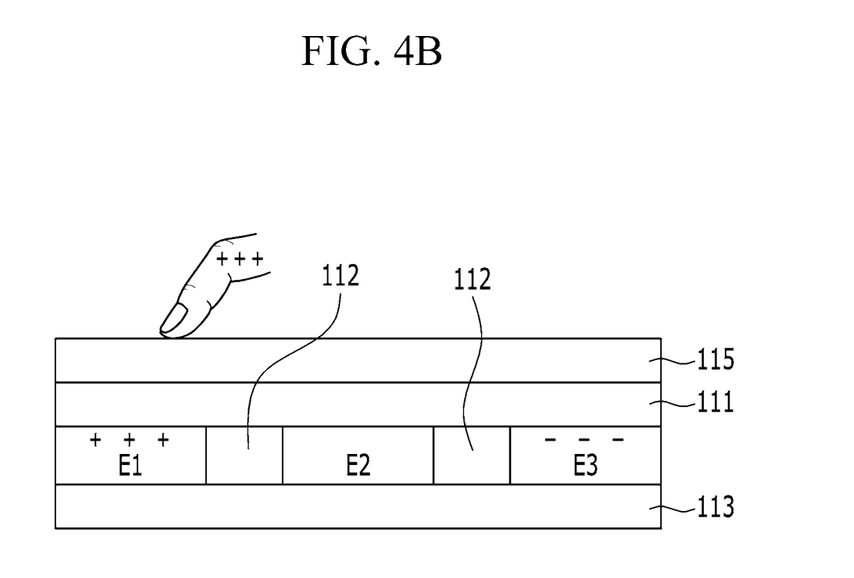
Figure 4C:
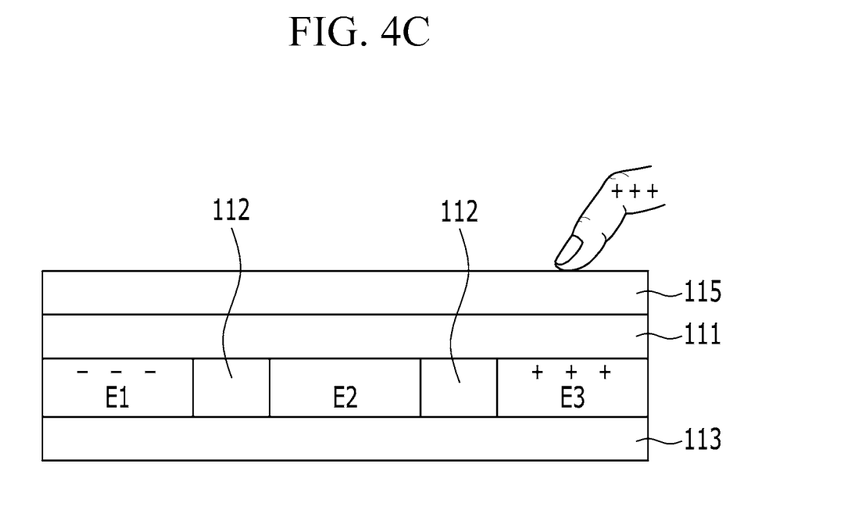

FIGS. 4A, 4B, and 4C are diagrams for describing a configuration of a touch display device according to another exemplary embodiment of the present invention, and a process of generating friction electricity.

Referring to FIG. 4A, the touch display device according to the current exemplary embodiment of the present invention further includes a substrate 115. The substrate 115 may be disposed on the dielectric layer 111.

For convenience of explanation, FIGS. 4B and 4C illustrate a portion of the touch display device which includes the third sensing electrode E3.

In FIG. 4B, the user's finger 114 is touched on the first sensing electrode E1.

In FIG. 4C, as the user's finger 114 moves, the user's finger 114 is touched on the second sensing electrode E2.

Similar to the exemplary embodiment of FIGS. 3A and 3B, in FIG. 4B, when the first sensing electrode E1 and the third sensing electrode E3 are connected to each other by an electric wire, a current flows from the first sensing electrode E1 to the third sensing electrode E3.

In FIG. 4C, when the first sensing electrode E1 and the third sensing electrode E3 are connected to each other by an electric wire, a current flows from the third sensing electrode E3 to the first sensing electrode E1.

Figure 5A:
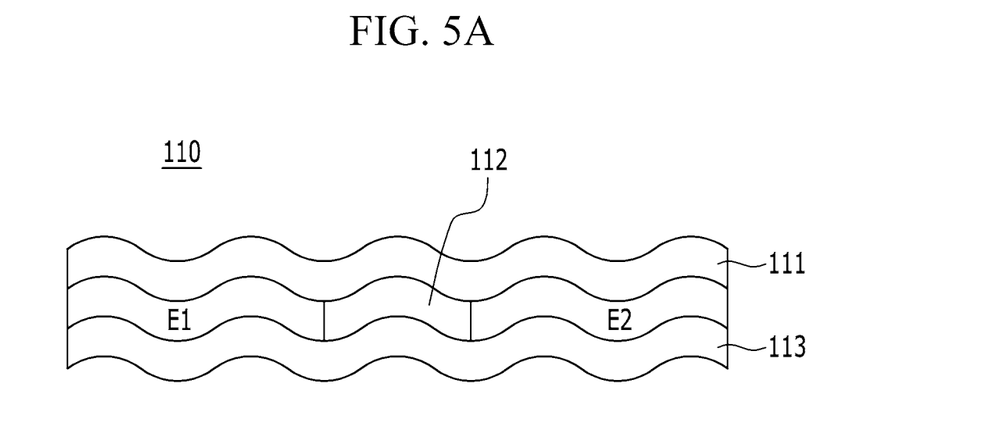
FIGS. 5A and 5B are diagrams describing a configuration and an operation of a touch display device according to still another exemplary embodiment of the present invention.
Figure 5B:
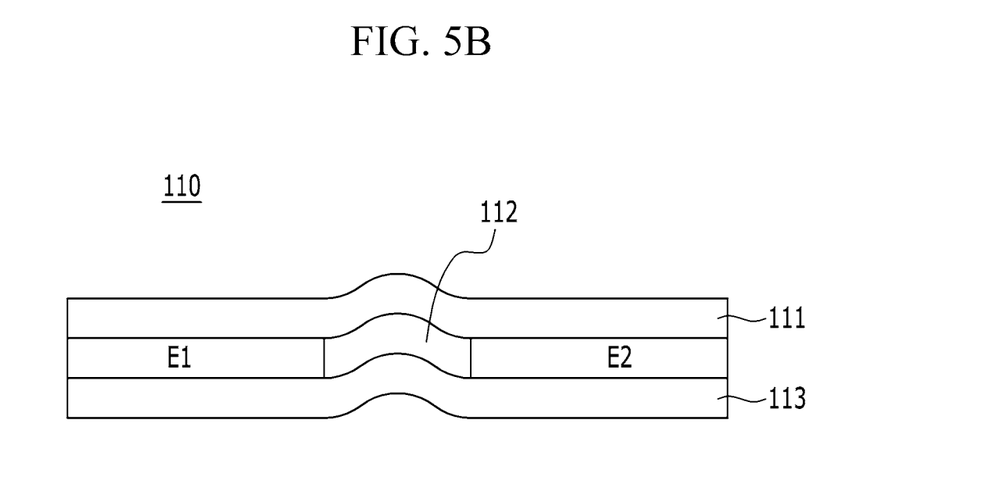

FIGS. 5A and 5B are diagrams for describing a configuration and an operation of a touch display device according to still another exemplary embodiment of the present invention.

Referring to FIG. 5A, the panel 100 of the touch display device is bent in a wave shape, the "waves" having radii of curvature. For convenience of explanation, FIG. 5A illustrates only the portion 110 of the touch display device, but the whole panel 100 may be bent in a wave shape. Alternatively, the panel 100 may be partially bent in a wave shape, or in any other non-flat shape which may be characterized by one or more radii of curvature.

The bent substrate 113 may be produced by injection molding. Other components are deposited on the bent substrate 113 and thus may be produced in a bent shape.

In this case, the substrate 113 may be flexible.

A structure of the panel 100 illustrated in FIG. 5A has many merits.

When a voltage is applied to the plurality of sensing electrodes E1 to E30 in haptic providing mode, the panel 100 is smoothed out by a repulsive force (FIG. 5B), so that various ones of its radii of curvature are increased. That is, the shape of the panel 100 may be deformed by selectively applying a voltage to each sensing electrode and depending on how much voltage is applied to each sensing electrode.

In this manner, the user may receive tactile feedback during the time he or she is touching the panel 100.

The structure of the panel 100 also may be operated in energy harvesting mode. in this case, as the panel 100 is bent into a wave shape, the panel 100 has a surface area that is larger than that of a panel 100 that is flat. Therefore, a larger amount of charge may be generated, and as a result, a greater amount of energy may be harvested.

Figure 6:
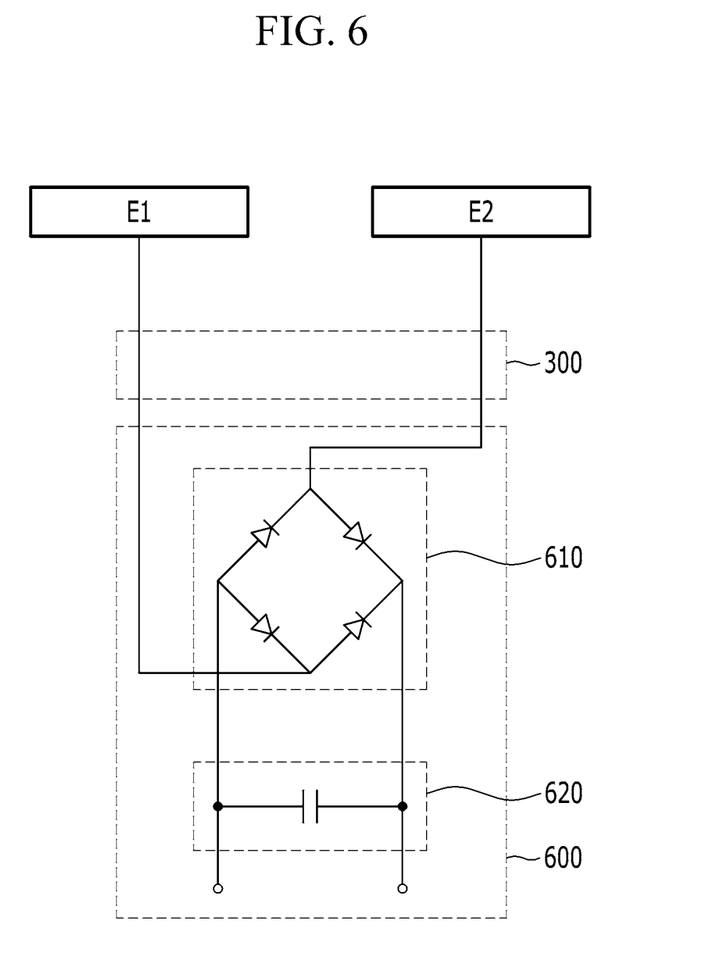
FIG. 6 is a circuit diagram describing a connection relationship between a sensing electrode and an energy harvesting unit.

FIG. 6 is a circuit diagram for describing the connection relationship between the sensing electrode and the energy harvesting unit. Referring to FIG. 6, the first sensing electrode E1 and the second sensing electrode E2 form a circuit together with the energy harvesting unit 600 through the mode selection unit 300. The energy harvesting unit 600 includes the rectification unit 610 and the energy storage unit 620.

The time at which the circuit of FIG. 6 is formed may be the time when the touch display device is driven in the energy harvesting mode, as directed by the timing control unit 200.

To form this circuit, the mode selection unit 300 connects at least two sensing electrodes to a rectifier of the rectification unit 610. The exemplary embodiment of FIG. 6 illustrates only the first sensing electrode E1 and the second sensing electrode E2, but is not limited thereto. One of ordinary skill in the art will observe that any number of sensing electrodes can be connected. For example, the closed circuit may also be configured by connecting one terminal of the rectifier of the rectification unit 610 to three sensing electrodes E1, E6, and E11 and the other terminal of the rectifier of the rectification unit 610 to three other sensing electrodes E2, E7, and E12.

As described in the exemplary embodiment of FIGS. 3 and 4, as a positively charged finger 114 moves, a direction of current flowing through the sensing electrodes E1 and E2 changes. Therefore, the rectifier serves to make the direction of current constant. FIG. 6 illustrates a basic rectifier configured of four diodes, but any circuit performing a rectification operation may be used.

The rectifier may be formed for each pair of sensing electrodes which form the closed circuit. For example, a rectifier for the first sensing electrode E1 and the second sensing electrode E2, a rectifier for the sixth sensing electrode E6 and the seventh sensing electrode E7, and a rectifier for the eleventh sensing electrode E11 and the twelfth sensing electrode E12 may each be formed independently. In this case, even though a plurality of touch drags occurs, energy harvesting may be made for all the touch drags.

Rectifiers may also be formed for the first sensing electrode groups E1, E6, and E11 and the second sensing electrode groups E2, E7, and E12.

Further, the rectification unit 610 may be configured of single rectifier. Even when a multi-touch occurs, the single rectifier may perform the rectification processing by increased scan speed. Connection and disconnection between the plurality of sensing electrodes and the single rectifier may be initiated by a scan signal.

The energy storage unit 620 includes at least one capacitive element. The capacitive element may be a capacitor. The capacitive element is coupled with the plurality of rectifiers in parallel, and thus only one capacitive element may be formed. Alternatively, multiple capacitive elements may also be implemented for each rectifier.

Figure 7:
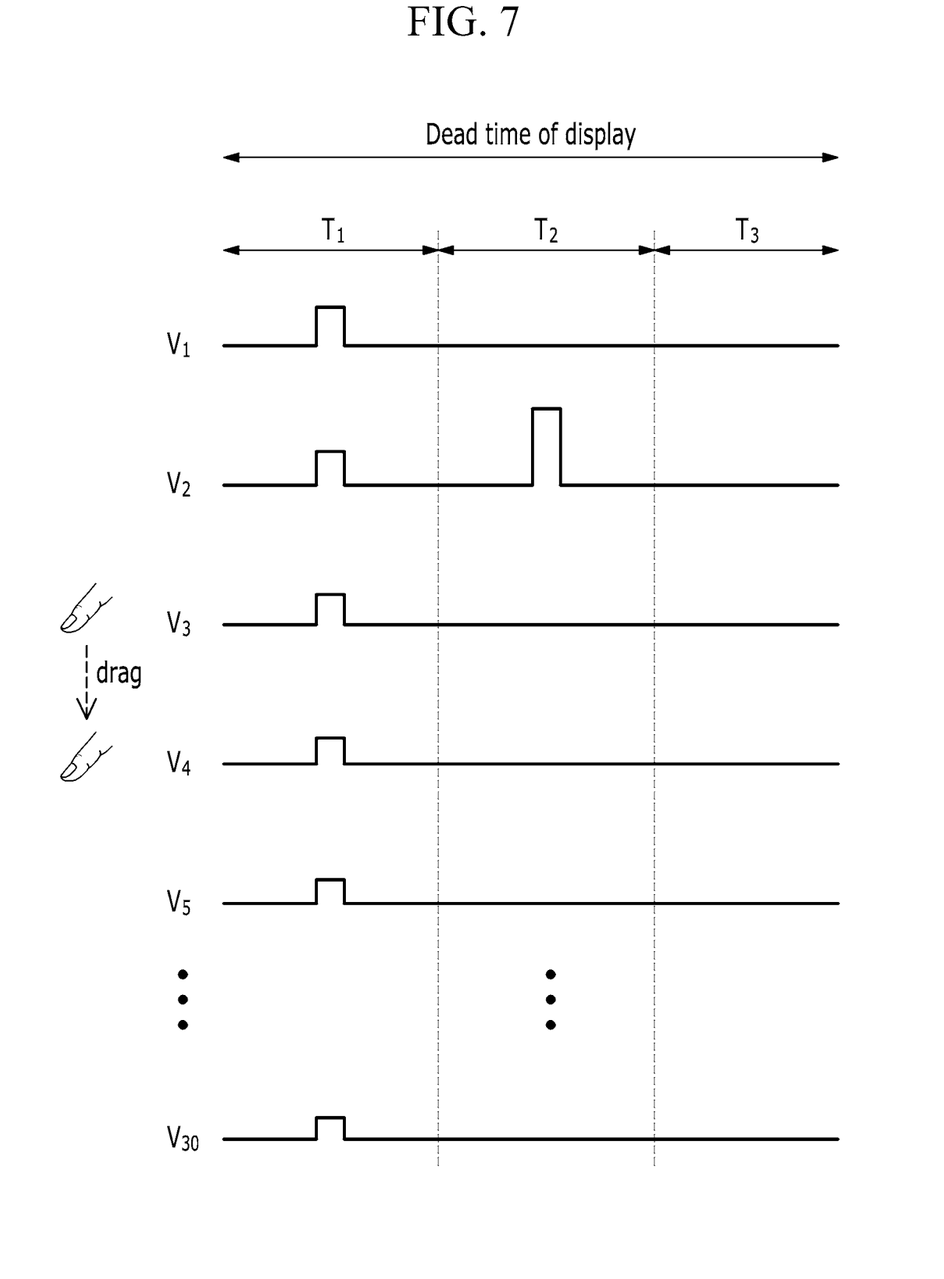
FIG. 7 is a timing diagram of a voltage applied to each sensing electrode for a dead time of a display.

FIG. 7 is a timing diagram of a voltage applied to each sensing electrode during a dead time of the display. Each voltage V1 to V30 corresponds to one sensing electrode E1 to E30.

The first period T1 corresponds to touch sensing mode. The exemplary embodiment of the present specification describes a self capacitance type touch driving scheme, and therefore a driving voltage may be simultaneously supplied to all the sensing electrodes. The driving voltage supply timing may be different for each touch display device. In the mutual capacitance type device, the driving voltage may be time-divided and supplied to each line, as is known.

In the first period T1, it is sensed that the user finger 114 moves from the third sensing electrode E3 to the fourth sensing electrode E4.

The second period T2 corresponds to haptic providing mode. The haptic driving unit 500 supplies the haptic driving voltage to the third sensing electrode E3 to provide tactile feedback to the user.

A third period T3 corresponds to energy harvesting mode. In this case, energy is harvested by harvesting a current generated by the friction electricity, not by applying a separate driving voltage to the sensing electrode.

In this case, a circuit is configured between the third sensing electrode E3 and the fourth sensing electrode E4. The energy harvesting process is as described in connection with FIG. 6.

The accompanying drawings and the detailed description of the present invention which are referred to herein are only examples of the present invention, and are used to describe the present invention but are not used to limit the meaning or the scope of the present invention described in the appended claims. Therefore, it will be appreciated by those skilled in the art that various modifications may be made therefrom and other equivalent embodiments are available. Accordingly, the actual technical protection scope of the present invention must be determined by the spirit of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Furthermore, different features of the various embodiments, disclosed or otherwise understood, can be mixed and matched in any manner to produce further embodiments within the scope of the invention.

DESCRIPTION OF SYMBOLS

100: Panel
200: Timing control unit
300: Mode selection unit
400: Touch control unit
500: Haptic driving unit
600: Energy harvesting unit
610: Rectification unit
620: Energy storage unit
111: Dielectric layer
112: Insulator
113, 115: Substrate

What is claimed is:

1. A touch display device having at least a touch sensing mode and an electric charge harvesting mode, comprising:
a touch display panel including a plurality of touch sensing electrodes which are arranged under a dielectric layer and in a matrix configuration, wherein adjacent ones of the touch sensing electrodes are separated by respective insulators disposed there-between;

a rectification unit including at least one rectifier configured to be connected to at least two touch sensing electrodes of the plurality of touch sensing electrodes in the electric charge harvesting mode, so as to receive electric charge from each of the at least two sensing electrodes, whereby:

a user touch body part having an electric charge touching the dielectric layer causes a corresponding electric charge on a first of the at least two touch sensing electrodes that is underneath the touch location, to thereby cause current to flow from the first touch sensing electrode to a second of the at least two touch sensing electrodes and to feed into the at least one rectifier to create a first rectified voltage, and the user touch body part having the electric charge moving to and touching the dielectric layer over the second touch sensing electrode causes a corresponding electric charge on the second touch sensing electrode, to thereby cause current to flow from the second touch sensing electrode to the first touch sensing electrode and to feed into the at least one rectifier to create a second rectified voltage; and an energy storage unit including at least one capacitive element which is connected to the at least one rectifier to store the first and second rectified voltages.

2. The touch display device of claim 1, wherein
the plurality of sensing electrodes comprises N pairs of the sensing electrodes, where N is a natural number;
the rectification unit includes N rectifiers, and
each pair of the sensing electrodes is connected to a different one of the rectifiers.

3. The touch display device of claim 1, wherein
the rectification unit comprises single rectifier, and
the plurality of sensing electrodes is connected to or disconnected from the single rectifier according to a control signal.

4. The touch display device of claim 1, wherein
the dielectric layer is charged with negative charge.

5. The touch display device of claim 1, wherein
the panel is bent so as to have a curved shape so as to have a first radius of curvature, and
the panel is further configured to receive a voltage and to flatten in response to the received voltage so as to have a second radius of curvature, the second radius of curvature being larger than the first radius of curvature.

6. The touch display device of claim 1, wherein
the touch display device is a self capacitance type display device.

7. The touch display device of claim 1, further comprising:

a timing control unit configured to output a control signal during at least one of a plurality of driving modes, the plurality of driving modes including a first driving mode, a second driving mode, and a third driving mode;

a touch control unit configured to supply a touch driving voltage and to process a touch signal; and a mode selection unit configured to connect the sensing electrodes to the touch control unit in the first driving mode and to selectively connect ones of the sensing electrodes to the rectification unit in the second driving mode.

8. The touch display device of claim 7, further comprising a haptic driving unit configured to supply a haptic voltage,
wherein the mode selection unit is further configured to connect the sensing electrodes to the haptic driving unit in the third driving mode.

9. The touch display device of claim 7, wherein the touch display device is further configured to implement each driving mode in a time divided manner.

10. The touch display device of claim 9, wherein
the touch display device is further configured to implement the second driving mode after the first driving mode,
at least two sensing electrodes form a circuit in the second driving mode, together with the rectifier of the rectification unit, and
the energy storage unit is configured to store a current generated in the closed circuit by a touch.

11. The touch display device of claim 10, wherein the touch display device is further configured to repeatedly implement the first driving mode and the second driving mode during a dead time of the display.

* * * * *